Aug. 4, 1959

S. G. FALK 2,898,116

MECHANISM FOR SUCCESSIVELY RELEASING
STACKED PHONOGRAPH RECORDS

Filed April 13, 1954

2 Sheets-Sheet 1

INVENTOR

SVEN GUSTAF FALK

BY [signature]

AGENT

Aug. 4, 1959 S. G. FALK 2,898,116

MECHANISM FOR SUCCESSIVELY RELEASING STACKED PHONOGRAPH RECORDS

Filed April 13, 1954 2 Sheets-Sheet 2

INVENTOR

SVEN GUSTAF FALK

BY Fred M Vogel

AGENT

United States Patent Office 2,898,116

Patented Aug. 4, 1959

2,898,116

MECHANISM FOR SUCCESSIVELY RELEASING STACKED PHONOGRAPH RECORDS

Sven Gustaf Falk, Stockholm, Sweden, assignor, by mesne assignments, to North American Philips Company, Inc., New York, N.Y., a corporation of Delaware Application April 13, 1954, Serial No. 422,874

Claims priority, application Netherlands April 17, 1953

4 Claims. (Cl. 274—10)

This invention relates to a central spindle for successively releasing sound records having a large central opening which spindle comprises a housing and a bar secured thereto which carries the housing above a turntable. The housing comprises at least two main supports carrying a stack of records and at least two knife-shaped auxiliary supports which are spaced from the main supports by a distance substantially corresponding to the thickness of the record to be played. The lowermost record of the stack is released by retracting the main supports into the housing while the auxiliary supports slide simultaneously between the lowermost and the next record, the motion of the supports being controlled by means of a pin fitted in the spindle.

In the assembled state, the supports are movable in the required manner since the housing follows the rotation of the turntable when the pin is braked or held, or by moving the pin relatively to the stationary housing. In the conventional constructions, the main supports and the auxiliary supports are of different and frequently complicated construction to obtain the desired motion which makes this comparatively simple apparatus laborious and expensive.

The present invention has for its object to overcome the aforesaid disadvantage. According to the invention the supports are constructed uniform and consist of thin plates with a slot into which enters a lug coupled to an elongated pin. The required motion of the plates as supports is obtained by mounting of the plates in part in a sense opposite to the position of the remaining plates. The simple uniform plates can be stamped in one operation by means of the same tool from sheet material, thus obtaining a considerable saving in cost. By mounting the plates in part in a sense opposite to that of the others the motion of the pin can be directly converted into the required motion of the plates. If the pin performs a rotation about its own axis, the main supports are required to be mounted in the same position and the auxiliary supports in the opposite position, and if the pin performs a reciprocal motion in the plane of the plates each main support and a diametrically opposed auxiliary support will occupy the same position.

In order to ensure the desired spacing of the plates in a suitable embodiment of the present invention the plates are flat and the pin is coupled with a plate-shaped member which is situated between the main supports and the auxiliary supports and is provided at both sides with lugs entering into slots of the supports. As an alternative, the plates may be so guided in the housing as to maintain the aforesaid desired spacing. In this case the pin may be mounted on a pivot extending at right angles thereto, while the pin itself passes through the slots. In this construction, the moving parts are consequently constituted only by the plates and by the pin required for the control. In this manner the record spindle is reduced to its simplest shape.

In order that the invention may be readily carried into effect, it will now be described with reference to the accompanying drawing, given by way of example, in which.

Figure 1:
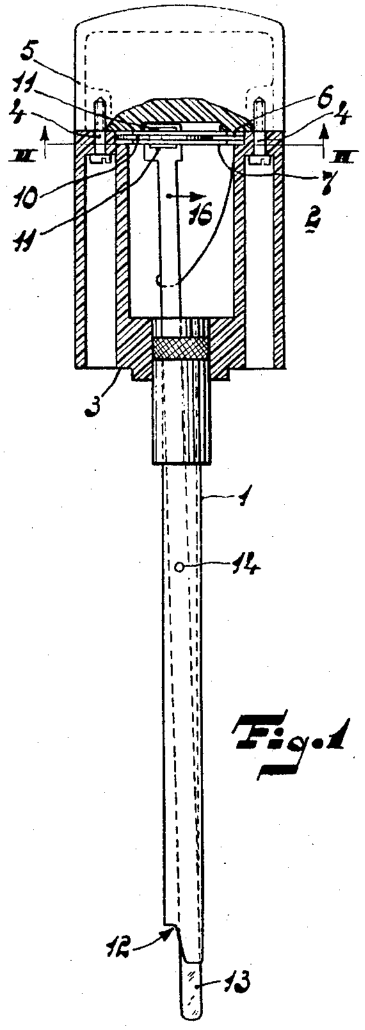
Fig. 1 shows partially in section a central record spindle according to the invention.

A two-part housing 2 is mounted on a rod 1 which passes through the opening of a turntable. The housing comprises a portion 3 secured to the rod 1 and an upper part 5 secured thereto by means of bolts 4. Two main supports 6 and two auxiliary supports 7 are provided between the two parts of the housing so as to be movable only in a radial direction. In the drawing, the main supports 6 are situated above the auxiliary supports 7. Alternatively, the main supports may be located below the auxiliary supports. The manner in which this may be effected in the present construction will be explained hereinafter.

Figure 4:
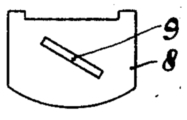
Fig. 4 represents a separate plate employed as a support in the record spindle shown in Figures 1 to 3.

The supports 6 and 7 consist of uniform thin plates 8 furnished with a slot 9 (Fig. 4). A plate-shaped member 10 provided with lugs 11 at both sides is provided between the supports.

Figure 2:
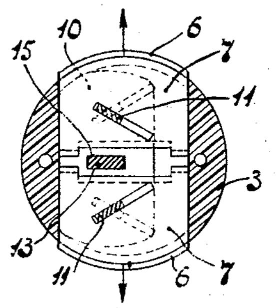
Fig. 2 is a cross-section on the line II—II in Fig. 1.
Figure 3:
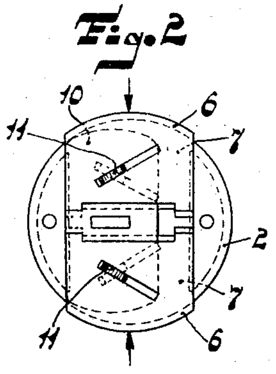
Fig. 3 is a plan view of Fig. 1 after removal of the upper part of the housing.

An elongated pin 13 is movable about a pivot 14, which extends transversely thereto in a slot 12 of the rod 1. The lower end of the pin 13 projects outside of the rod 1 so that this end can be given a reciprocal movement by the mechanism of the record player. Said pin 13 extends into the housing 2 and passes through a hole 15 of the plate-shaped member 10 thus transmitting the movement of the pin 13 in the direction of the arrow 16 in Fig. 1 and back to the plate-shaped member 10. The plates 8 are mounted in the housing 2 in such a manner that the lugs 11 enter into the opening 9. Figs. 2 and 3 clearly show that the position of one support 6 and one support 7 has been obtained only by displacing the plate 8 shown in Fig. 4 in the plane of the drawing, while the position of the two remaining plates is only determined by rotation out of the plane of the drawing.

By inverting all the plates shown in Figs. 2 and 3 out of the plane of the drawing a construction is obtained in which the main supports are situated below the auxiliary supports.

A movement of the pin 13 in the direction of the arrow 16 will involve a radial displacement of the supports such that, taken from the position shown in the drawing, the main supports 6 are first moved inwardly (Fig. 3) and the auxiliary supports 7 are simultaneously moved outwardly (Fig. 2).

It will be evident that the plate-shaped member 10 may be dispensed with and the plates 8 may be given a greater length such that the pin 13 itself passes through the openings 9. In this case the supports referred to above partially overlap each other.

Figure 5:
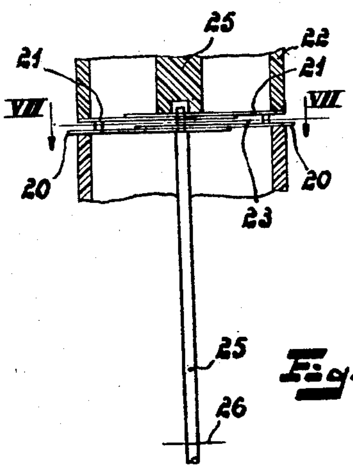
Fig. 5 shows partially in section an alternate embodiment of the record spindle shown in Figures 1 to 3.
Figure 6:
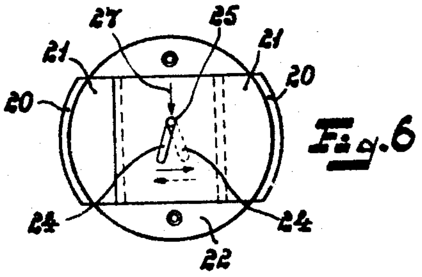
Fig. 6 is a plan view of Fig. 5 after removal of the upper part of the housing.
Figure 7:
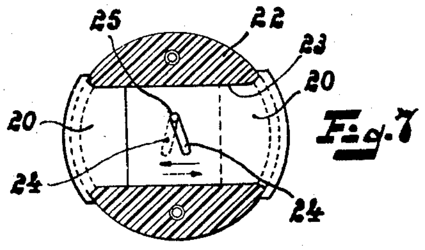
Fig. 7 is a cross section on the line VII—VII of Fig. 5.

Said alternate embodiment is partially shown in Figs. 5, 6 and 7. Two main supports 20 and two auxiliary supports 21 are guided in a housing 22 and separated by a rib 23 thereof in order to ensure the desired spacing of the plates 20 and 21. In the drawing, the main supports 20 are situated above the auxiliary supports 21. All supports 20 and 21 are mounted in such a manner in the housing 22 so as to be movable only in a radial direction. The supports 20 and 21 consist of uniform thin plates furnished with a slot 24. The plates 20, 21 have a greater length as the plates 8 shown in Fig. 4, so that a pin 25 movable about a pivot 26 mounted in a shaft (not shown) passes through the slots 24. The supports partially overlap each other.

A movement of the pin 25 in the direction of the arrow 27 will involve a radial displacement of the supports such that, taken from the position shown in the drawing, the main supports 20 are first moved inwardly (Fig. 7) and the auxiliary supports 21 are moved outwardly (Fig. 6).

It is to be understood that the invention is not limited to the mode of motion of the pin 13. The advantage accruing from the invention is likewise obtainable by using a pin moving about its own axis. In this case only the position of part of the plates requires modification.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A mechanism for successively releasing stacked phonograph records having a central opening onto a turntable comprising a spindle including a housing, a hollow shaft secured to said housing, at least two movable main supports in said housing for carrying said record stack, at least two movable auxiliary supports spaced vertically from opposite main supports by a distance substantially equal to the thickness of each of the records to be played, an elongated pin operatively coupled to said main and auxiliary supports for moving the same, means mounting said pin for pivotal movement in said shaft with the free end of said pin extending outside said shaft, said main and auxiliary supports being relatively thin plates of identical configuration and each having a slot surrounded on all sides by surfaces of said plate and positioned obliquely to the direction of movement of said supports whereby when said pin is moved in a predetermined direction substantially transverse to the direction of movement of said supports, said pin operatively engages said slots of the main supports thereby moving the latter to cause retraction thereof and thereby releasing the lowermost record of the stack, the auxiliary supports being moved simultaneously between the lowermost record and the adjacent superposed record.

2. A mechanism as set forth in claim 1 further comprising a pivot in said shaft, said pin being mounted on said pivot and substantially transversely thereto, and said pin being adapted to directly engage both said main and auxiliary supports to move the same.

3. A mechanism for successively releasing stacked phonograph records having a central opening onto a turntable comprising a spindle including a housing, a hollow shaft secured to said housing, at least two movable main supports in said housing for carrying said record stack, at least two movable auxiliary supports vertically spaced from opposite main supports by a distance substantially equal to the thickness of each of the records to be played, a plate-shaped member positioned between said main and auxiliary supports provided with a plurality of lugs on both the top and bottom surfaces of said member, an elongated pin secured at one end to said plate-shaped member, means mounting said pin in said shaft for pivotal movement therein, said supports being relatively thin plates of identical configuration and each having a slot therein surrounded on all sides by surfaces of said plate and positioned obliquely to the direction of movement of said supports whereby when said pin is moved in a predetermined direction substantially transverse to the direction of movement of said supports the lugs on said member are moved in said slots thereby causing the retraction of said main supports to consequently release the lowermost record of the stack, the auxiliary supports being moved simultaneously between the lowermost record and the adjacent superposed record.

4. A mechanism for successively releasing stacked phonograph records as set forth in claim 1 wherein at least two of said supports partially overlap each other, and a projection on said housing located for spacing said main and auxiliary supports.

References Cited in the file of this patent

UNITED STATES PATENTS

| | | |
|---|---|---|
| 2,507,041 | Morrill | May 9, 1950 |
| 2,666,647 | Dale | Jan. 19, 1954 |
| 2,666,648 | Dale | Jan. 19, 1954 |
| 2,682,412 | Carlson | June 29, 1954 |

FOREIGN PATENTS

| | | |
|---|---|---|
| 72,147 | Norway | May 27, 1947 |